(12) United States Patent
Drost et al.

(10) Patent No.: US 9,083,449 B2
(45) Date of Patent: Jul. 14, 2015

(54) METHOD AND SYSTEM FOR OPTIMIZING SIGNAL RECOGNITION IN A MULTIWAVELENGTH OPTICAL COMMUNICATION SYSTEM

(71) Applicant: U.S. Army Research Laboratory ATTN: RDRL-LOC-I, Adelphi, MD (US)

(72) Inventors: Robert James Drost, Washington, DC (US); Brian M Sadler, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 311 days.

(21) Appl. No.: 13/676,690

(22) Filed: Nov. 14, 2012

(65) Prior Publication Data

US 2013/0148980 A1 Jun. 13, 2013

Related U.S. Application Data

(60) Provisional application No. 61/568,552, filed on Dec. 8, 2011.

(51) Int. Cl.
| | |
|---|---|
| *H04B 10/516* | (2013.01) |
| *H04B 10/00* | (2013.01) |
| *H04B 10/116* | (2013.01) |

(52) U.S. Cl.
CPC .............. *H04B 10/00* (2013.01); *H04B 10/116* (2013.01)

(58) Field of Classification Search
USPC ................................................. 398/172, 159
See application file for complete search history.

(56) References Cited

U.S. PATENT DOCUMENTS

| | | | | |
|---|---|---|---|---|
| 2002/0167701 A1* | 11/2002 | Hirata | ........................... | 359/172 |
| 2010/0247112 A1* | 9/2010 | Chang | ........................... | 398/182 |
| 2013/0064541 A1* | 3/2013 | Walewski | ....................... | 398/25 |
| 2014/0169802 A1* | 6/2014 | Magri et al. | .................. | 398/183 |

FOREIGN PATENT DOCUMENTS

WO  WO 2011/144607  * 11/2011  ............. H04B 10/08

OTHER PUBLICATIONS

Kamio et al., "Pre-equalization for 10 G symbol/s 16-QAM in a Vector Modulator", IEEE, 2008.*
"Optical Networks: A Practical Perspective" by Ramaswami et al., Morgan Kaufmann, 1998, pp. 186-187.*

(Continued)

*Primary Examiner* — Shi K Li
(74) *Attorney, Agent, or Firm* — Lawrence E. Anderson

(57) ABSTRACT

A system and method for optimizing signal recognition in a light communication system by approximately maximizing the minimum distance between received constellation points; the method comprising identifying the constellation region containing points for transmitting symbols, identifying channel impairments, transforming the constellation region according to the channel impairments into a constellation region of potential received symbols, using signal processing circuitry to apply an algorithm that operates to maximize the minimum distance between constellation points to obtain a symbol constellation in the receiver constellation region, and inverting the transformation to obtain the designed transmitted-symbol constellation. The system comprises signal processing circuitry for performing a preferred methodology.

20 Claims, 16 Drawing Sheets

Preferred 8-CSK Constellation

Preferred 16-CSK Constellation

(56) References Cited

OTHER PUBLICATIONS

B. D. Lubachevsky, "How to simulate billiards and similar systems," Journal of Computational Physics, vol. 94, No. 2, pp. 255-283, May 1991.

Yokoi, Atsuya, "CSK constellation description" IEEE P802.15 Wireless Personal Area Networks, IEEE P802.15 Working Group for Wireless Personal Area Networks, Jul. 30, 2010. https://mentor.ieee.org/802.15/dcn/10/15-10-0406-03-0007-csk-constellationdescription.docx.

H. L. Minh, et al., "100-Mb/s NRZ visible light communications using a postequalized white LED," IEEE Photonics Technology Letters, vol. 21, No. 15, pp. 1063-1065, Aug. 2009.

Z. Na, Z. Jiang, and Z. Qiduan, "The transmission performance of the MPPM modulation in indoor optical wireless communication based on white LED," in Proceeding of SPIE, 2008.

J. Grubor, S. Randel, K.-D. Langer, and J. W. Walewski, "Broadband information broadcasting using LED-based interior lighting," Journal of Lightwave Technology, vol. 26, No. 24, pp. 3883-3892, Dec. 2008.

M. Hifi and R. M'Hallah, "A literature review on circle and sphere packing problems: Models and methodologies," Advances in Operations Research, vol. 2009, pp. 1-22, 2009.

H. J. B. M. Melissen, "Densest packings of congruent circles in an equilateral triangle," The American Mathematical Monthly, vol. 100, No. 10, pp. 916-925, Dec. 1993.

R. L. Graham and B. D. Lubachevsky, "Dense packings of equal disks in an equilateral triangle: From 22 to 34 and beyond," Electronic Journal of Combinatorics, vol. 2, pp. 1-39, 1995.

\* cited by examiner

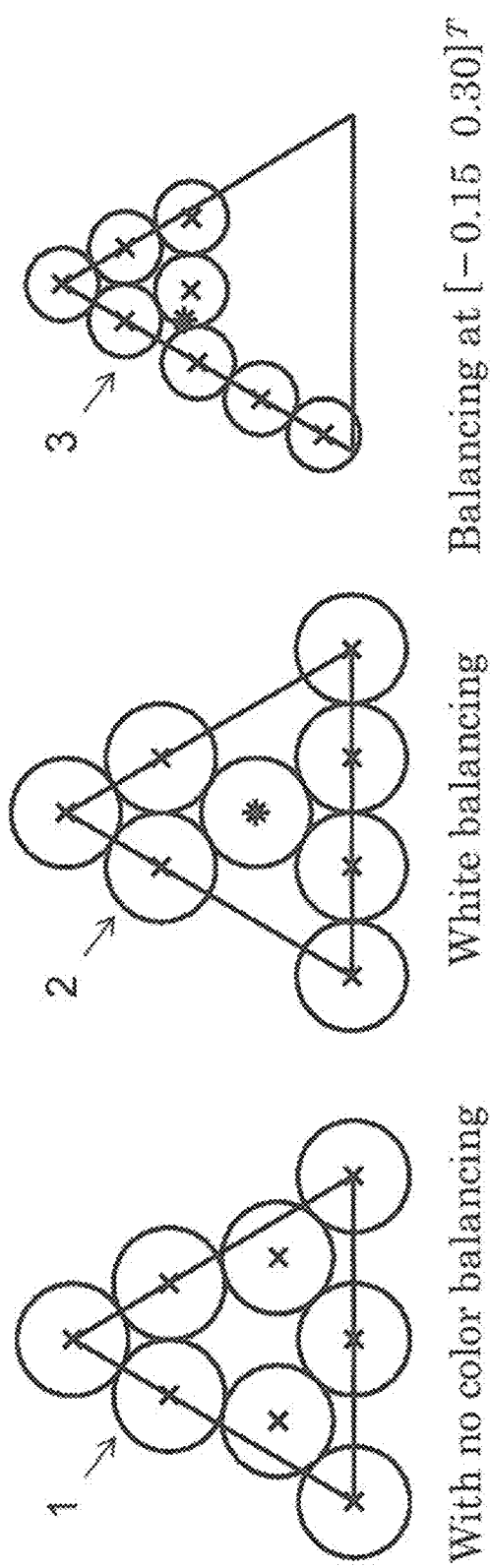

FIG. 2

11 — Input: $N$, $w$, $r_{avg}$ (if desired), $KE_0$, rate    Output: $r$, $d_{min}$ 12 — Compute $n$ from $w$
$(r, v) \leftarrow \text{initialize}(w, n, r_{avg}, KE_0)$
while termination criterion not met do
$\quad i^* \leftarrow \text{argmin } t_i^{new}$
$\quad r_{i^*} \leftarrow r_{i^*} + (t_{i^*}^{new} - t_{i^*}^{old})v_{i^*}$
$\quad t_{i^*}^{old} \leftarrow t_{i^*}^{new}$
$\quad t_{i^*}^* \leftarrow t_{i^*}^{new}$ 13 — if $j^* > 0$ then
$\quad r_{j^*} \leftarrow r_{j^*} + (t_{j^*}^{new} - t_{j^*}^{old})v_{j^*}$
$\quad t_{j^*}^{old} \leftarrow t_{j^*}^{new}$
$\quad (v_{i^*}, v_{j^*}) \leftarrow \text{disk\_collision}(r_{i^*}, v_{i^*}, r_{j^*}, v_{j^*}, \text{rate})$
end if 14 — if $j^* < 0$ then
$\quad (r_{i^*}, v_{i^*}, t_{i^*}^{old}, t_{i^*}^{new}, f) \leftarrow \text{wall\_collision}(i^*, r, v, t^{old}, t^{new}, f, n, -j^*)$
end if 15 — if $j^* > 0$ then
$\quad (t^{new}, f) \leftarrow \text{next\_collision}(j^*, i^*, r, v, t^{old}, t^{new}, f, w, n, \text{rate})$
end if
$(t^{new}, f) \leftarrow \text{next\_collision}(i^*, j^*, r, v, t^{old}, t^{new}, f, w, n, \text{rate})$
end while 16 — $t \leftarrow \min t_i^{new}$
$r_i \leftarrow (t_i^{old} - t) + r_i \forall i$
$d_{min} \leftarrow t \times \text{rate}$

17

FUNCTION $(r, v) \leftarrow$ initialize$(w, n, r_{avg}, KE_0)$
center $\leftarrow \frac{1}{K} \sum_k w_k$
dist $\leftarrow \min_k [(w_k - \text{center}) \cdot \mathbf{n}_k]$
$r_i \leftarrow \text{center} + \frac{\text{dist}}{2} [\cos(\frac{2\pi i}{N}) \ \sin(\frac{2\pi i}{N})]^T \ \forall i$
$v_i \leftarrow \text{randn}(2) \ \forall i$
$KE \leftarrow \sum_i \|v_i\|^2$
$v_i \leftarrow \frac{v_i}{\|v_i\|} \sqrt{\frac{KE_0}{KE}}$

18

FUNCTION $(r, v, t^{old}, t^{new}, f) \leftarrow$ wall_collision$(i^*, r, v, t^{old}, t^{new}, f, \mathbf{n}_N)$
$\mathbf{u}_T \leftarrow [\mathbf{u}_N(2) \ -\mathbf{u}_N(1)]^T$
$v_{i^*} \leftarrow -(v_{i^*} \cdot \mathbf{u}_N) \mathbf{u}_N + (v_{i^*} \cdot \mathbf{u}_T) \mathbf{u}_T$

FUNCTION $(\mathbf{v}_{i'}, \mathbf{v}_{j'}) \leftarrow$ disk_collision$(\mathbf{r}_{i'}, \mathbf{v}_{i'}, \mathbf{r}_{j'}, \mathbf{v}_{j'}, \text{rate})$
$\mathbf{u}_N \leftarrow (\mathbf{r}_{j'} - \mathbf{r}_{i'})/\|\mathbf{r}_{j'} - \mathbf{r}_{i'}\|$
$\mathbf{u}_T \leftarrow [\mathbf{u}_N(2), -\mathbf{u}_N(1)]^T$
$v_{i',N} \leftarrow \mathbf{v}_{i'} \cdot \mathbf{u}_N$
$v_{j',N} \leftarrow \mathbf{v}_{j'} \cdot \mathbf{u}_N$
offset $\leftarrow \max\{0, 1.01 \times \text{rate} - (v_{j',N} - v_{i',N})/2\}$
$\mathbf{v}_{i'} \leftarrow (v_{j',N} - \text{offset})\mathbf{u}_N + (\mathbf{v}_{i'} \cdot \mathbf{u}_T)\mathbf{u}_T$
$\mathbf{v}_{j'} \leftarrow (v_{i',N} + \text{offset})\mathbf{u}_N + (\mathbf{v}_{j'} \cdot \mathbf{u}_T)\mathbf{u}_T$

20A

FUNCTION $(i^*, t^\text{new}) \leftarrow$ next_collision$(i^*, j^*, t, v, t^\text{old}, t^\text{new}, f, w, n, \text{rate})$
$P \leftarrow \infty$
for $j = 1$ to $N, j \neq i^*, j \neq j^*$ do
    $t^* \leftarrow$ disk_collision_time$(\mathbf{r}_{i^*}, \mathbf{v}_{i^*}, t^\text{old}_{i^*}, \mathbf{r}_j, \mathbf{v}_j, t^\text{old}_j)$
    if $t^* < P$ AND $t^* \leq t^\text{new}_j$ then
        $P \leftarrow t^*$
        $p \leftarrow j$
    end if
end for
$Q \leftarrow \infty$
for $j = 1$ to $K$ do
    $t^* \leftarrow$ wall_collision_time$(\mathbf{r}_{i^*}, \mathbf{v}_{i^*}, t^\text{old}_{i^*}, \mathbf{w}_j, \mathbf{n}_j)$
    if $t^* < Q$ then
        $Q \leftarrow t^*$
        $q \leftarrow j$
    end if
end for
[CONTINUED]

FIG. 4

20B if $Q < P$ then
$\quad f_{i^*} \leftarrow q$
$\quad t_{i^*}^{new} \leftarrow Q$
else
$\quad f_{i^*} \leftarrow p$
$\quad t_{i^*}^{new} \leftarrow p$
$\quad$ if $f_p > 0$ AND $f(j_p) == p$ then
$\quad\quad f(j_p) \leftarrow 0$
$\quad$ end if
$\quad f_p \leftarrow t^*$
$\quad t_p^{new} \leftarrow p$
end if

21A

FUNCTION $t^* \leftarrow$ disk_collision_time($\mathbf{r}_{i^*}, \mathbf{v}_{i^*}, t_{i^*}^{old}, \mathbf{r}_j, \mathbf{v}_j, t_j^{old}$)
$\tilde{t} \leftarrow \max\{t_{i^*}^{old}, t_j^{old}\}$
$\tilde{\mathbf{r}}_{i^*} \leftarrow \mathbf{r}_{i^*} + (\tilde{t} - t_{i^*}^{old})\mathbf{v}_{i^*}$
$\tilde{\mathbf{r}}_j \leftarrow \mathbf{r}_j + (\tilde{t} - t_j^{old})\mathbf{v}_j$
if $\|\tilde{\mathbf{r}}_j - \tilde{\mathbf{r}}_{i^*}\| < \tilde{t} \times$ rate then
$\quad t^* \leftarrow \tilde{t}$
else
$\quad a \leftarrow \|\mathbf{v}_j - \mathbf{v}_{i^*}\|^2 - $ rate$^2$
$\quad b \leftarrow (\tilde{\mathbf{r}}_j - \tilde{\mathbf{r}}_{i^*}) \cdot (\mathbf{v}_j - \mathbf{v}_{i^*}) - \tilde{t} \times$ rate$^2$
$\quad c \leftarrow \|\tilde{\mathbf{r}}_j - \tilde{\mathbf{r}}_{i^*}\|^2 - (\tilde{t} \times$ rate$)^2$ [CONTINUED]

FIG. 5

```
if b² - ac < 0 then
    t* ← ∞
else
    Δt ← -(b + √(b² - ac))/a
    if Δt < 0 then
        t* ← ∞
    else
        t* ← t̃ + Δt
    end if
end if
```
21B

```
FUNCTION t* ← wall_collision_time(r*, v*, t*^old, w_j, n_j)
v_{r*,N} ← v_{r*} · n_j
if v_{r*,N} < 0 then
    t* ← ∞
else
    t* ← t*^old + [(w_j - r*) · n_j] / v_{r*,N}
end if
```
22

FIG. 6

FUNCTION $(r, v) \leftarrow$ initialize$(w, n, r_{avg}, KE_0)$
dist $\leftarrow \min_k \left[ (w_x - r_{avg}) \cdot u_s \right]$
$r_x \leftarrow r_{avg} + \frac{\text{dist}}{2} \left[ \cos\left(\frac{2\pi i}{N}\right) \right]_{i=1}^{N} u_s$
$\pi \leftarrow \text{randperm}(N)$
$r \leftarrow r_{\pi}$
$v_{avg} \leftarrow \frac{1}{N} \sum v_i$
$v_i \leftarrow v_i - v_{avg}$
$KE \leftarrow \frac{1}{2} \sum \|v_i\|^2$
$v_i \leftarrow v_i \sqrt{\frac{KE_0}{KE}}$

— 23

FUNCTION $(r, v, t^{old}, t^{new}, f) \leftarrow$ wall_collision$(i^*, r, v, t^{old}, t^{new}, f, u_N)$
$\pi \leftarrow \text{randperm}(N)$
$k^* \leftarrow \min \{ k : \pi(k) \neq i^* \text{ AND } v_{\pi(k)} \cdot u_N < 0 \}$
$j^* \leftarrow \pi(k^*)$
$u_T \leftarrow [u_N(2) \; -u_N(1)]^T$
temp $\leftarrow v_{j^*} \cdot u_N$
$v_{j^*} \leftarrow (v_{j^*} \cdot u_N) u_N + (v_{j^*} \cdot u_T) u_T$
$r_{j^*} \leftarrow r_{j^*} + (t_{i^*}^{new} - t_{j^*}^{old}) v_{j^*}$
$v_{j^*} \leftarrow \text{temp} \times u_N + (v_{j^*} \cdot u_T) u_T$
$t_{j^*}^{old} \leftarrow t_{i^*}^{new}$
$t_{j^*}^{new} \leftarrow t_{i^*}^{new}$
if $f_{j^*} > 0$ then
  $f(f_{j^*}) \leftarrow 0$
end if
$f_{j^*} \leftarrow 0$

CONSTELLATION FOR RECEIVER

CONSTELLATION FOR TRANSMITTER

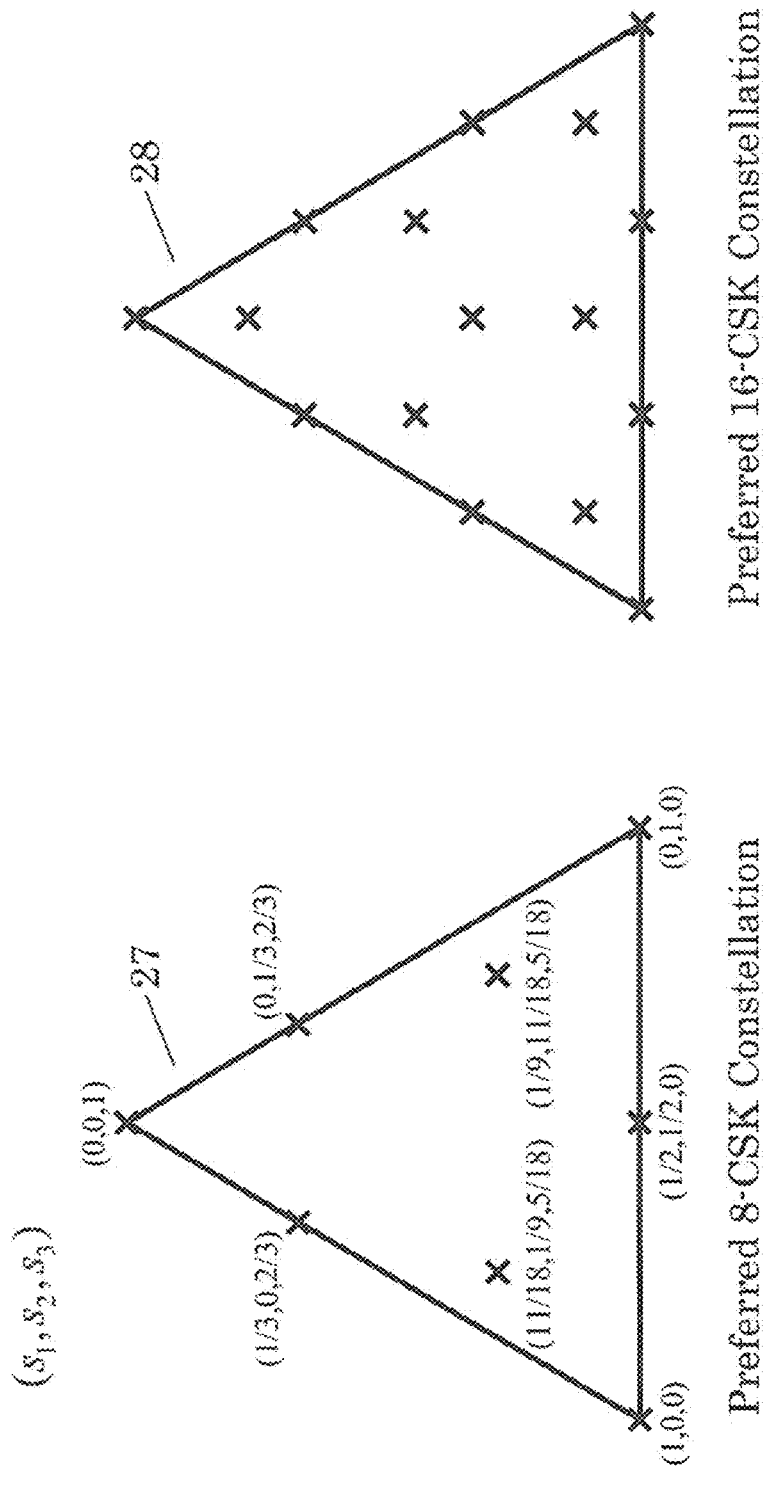

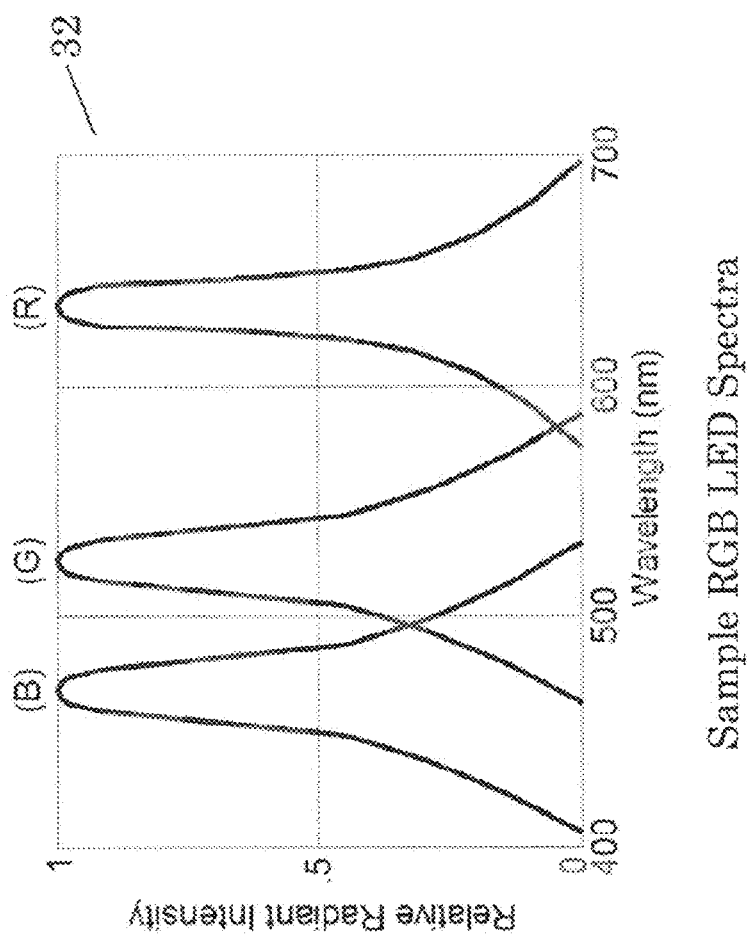
FIG. 11  LED EMISSION SPECTRA

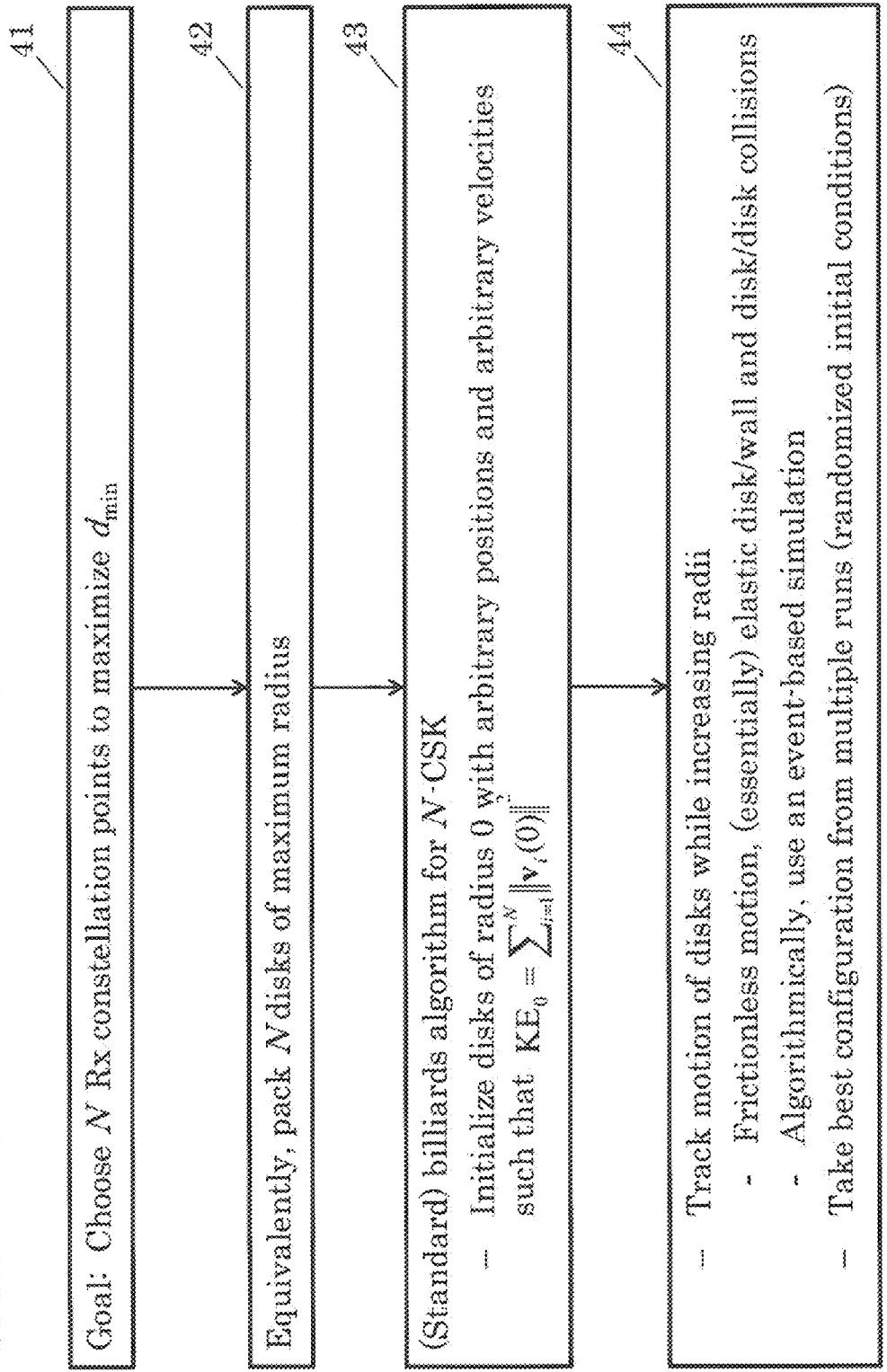

FIG. 12   OVERVIEW OF RECEIVER-CONSTELLATION DESIGN

Goal: Choose $N$ Rx constellation points to maximize $d_{min}$

Equivalently, pack $N$ disks of maximum radius (Standard) billiards algorithm for $N$-CSK
- Initialize disks of radius 0 with arbitrary positions and arbitrary velocities such that $KE_0 = \sum_{i=1}^{N} \|v_i(0)\|^2$

- Track motion of disks while increasing radii
  - Frictionless motion, (essentially) elastic disk/wall and disk/disk collisions
  - Algorithmically, use an event-based simulation
- Take best configuration from multiple runs (randomized initial conditions)

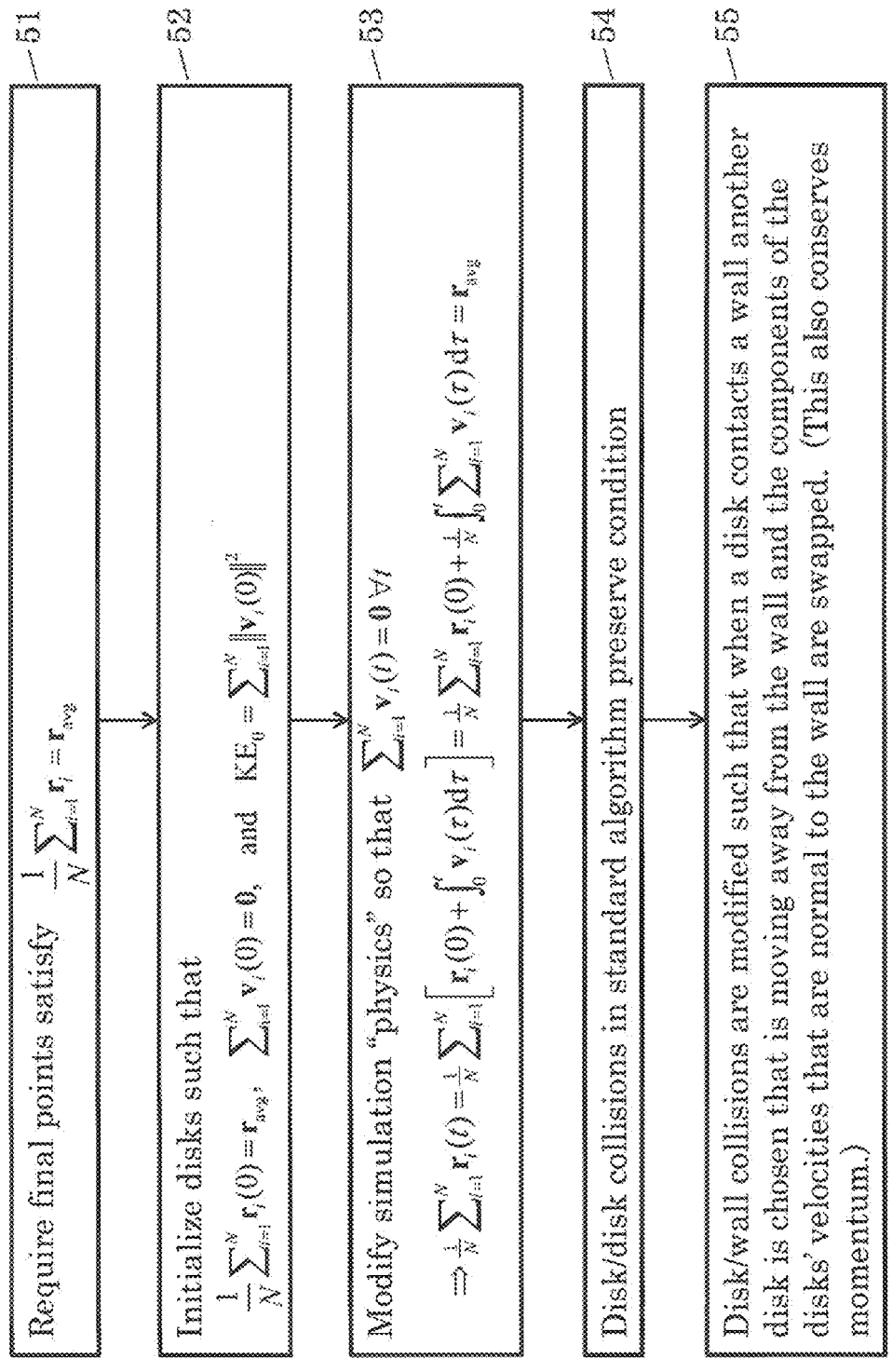
FIG. 13  OVERVIEW OF COLOR-CONSTRAINED RX-CONSTELLATION DESIGN

FIG. 14  UNCONSTRAINED TX CONSTELLATION DESIGN EXAMPLES
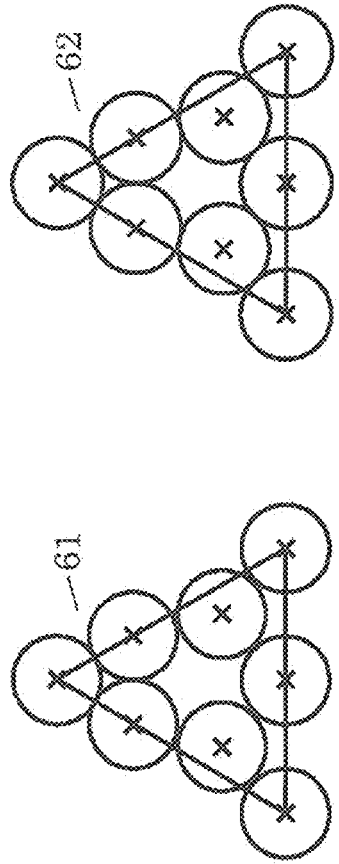

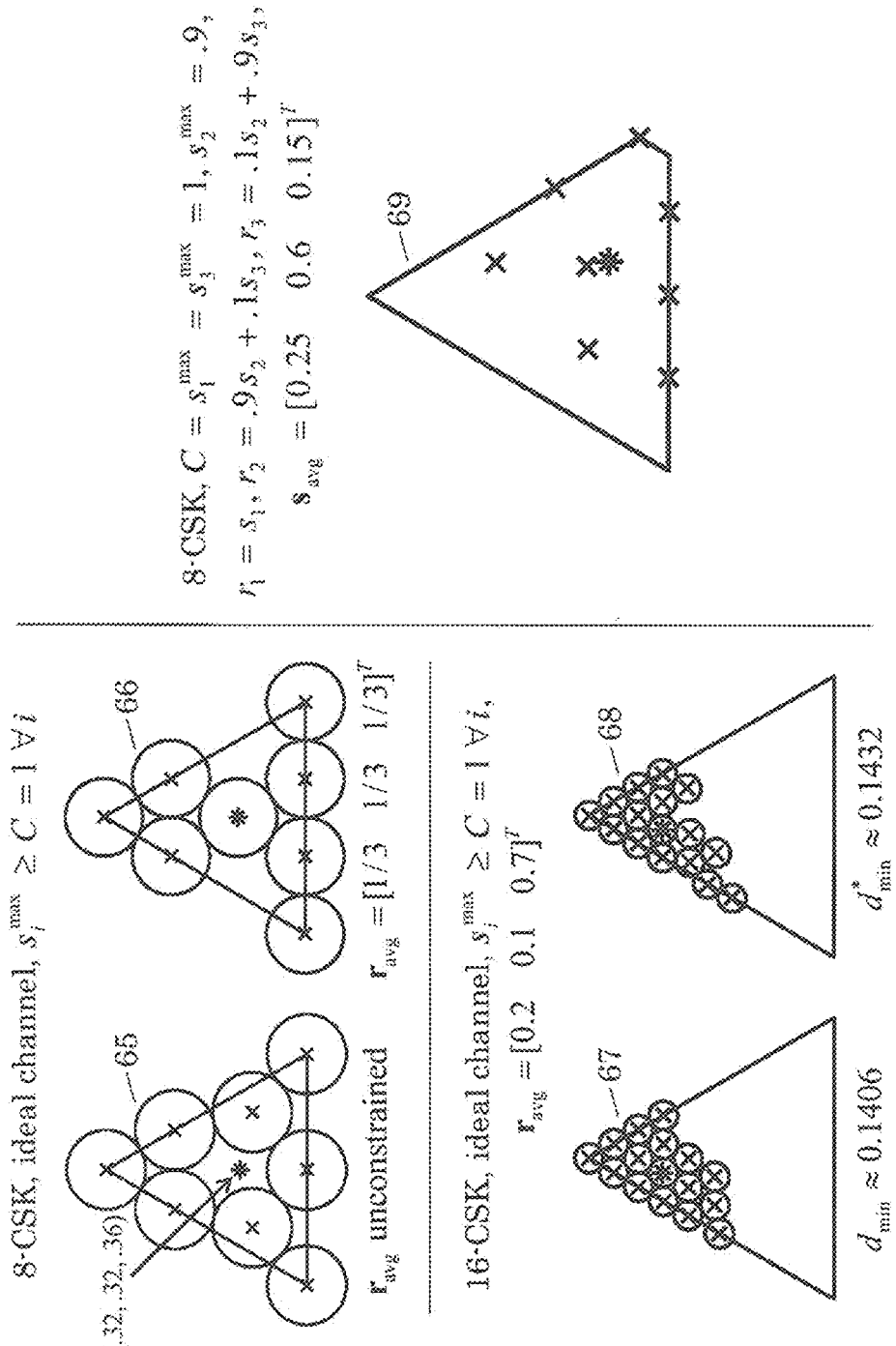
FIG. 15 CONSTRAINED TX CONSTELLATION DESIGN EXAMPLES

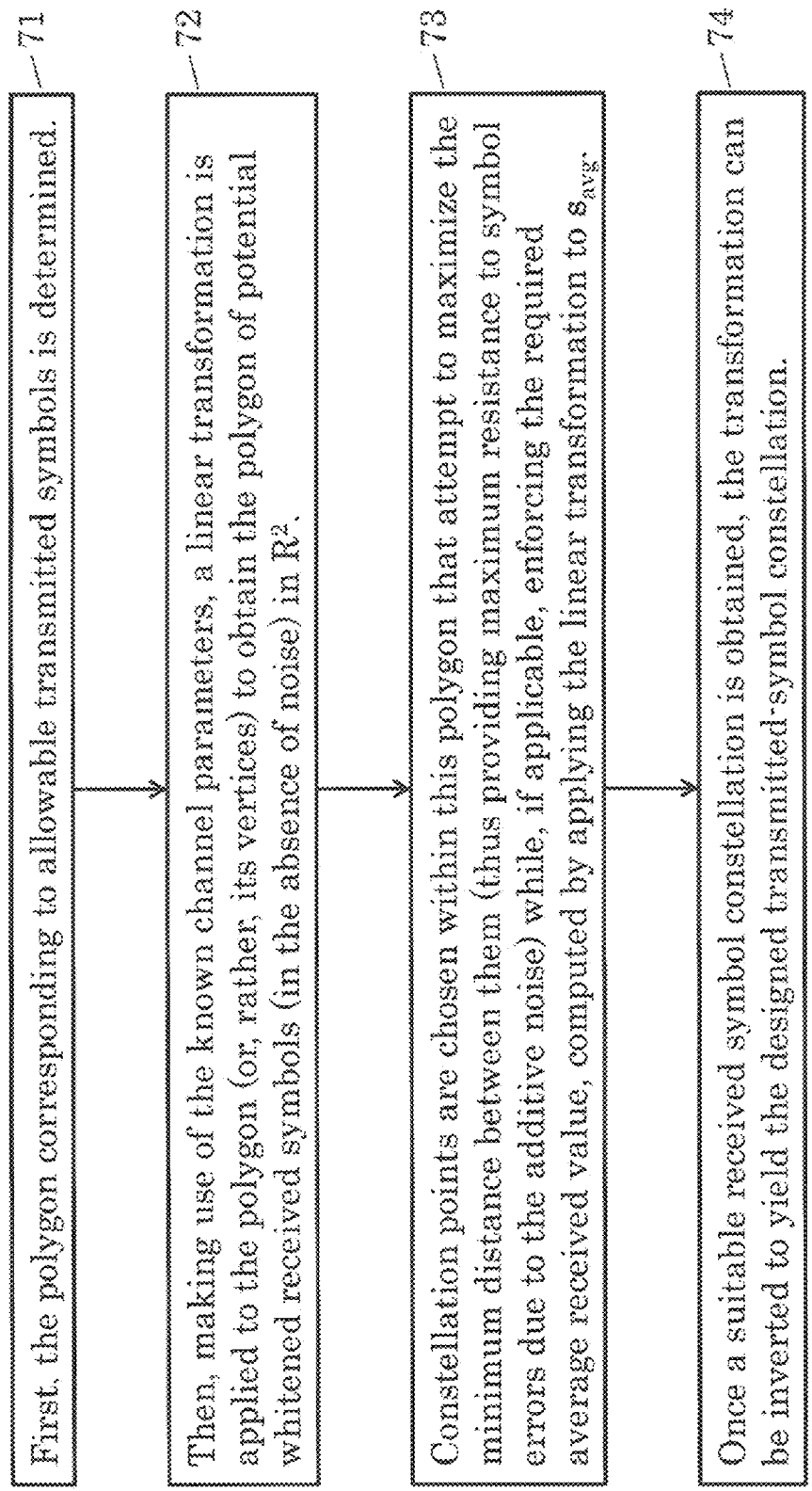
FIG. 16 OVERVIEW OF TRANSMITTED-CONSTELLATION DESIGN

US 9,083,449 B2

METHOD AND SYSTEM FOR OPTIMIZING SIGNAL RECOGNITION IN A MULTIWAVELENGTH OPTICAL COMMUNICATION SYSTEM

CROSS REFERENCE TO BELATED APPLICATIONS

This application claims priority to U.S. Provisional Application No. 61/568,552 filed Dec. 8, 2011, entitled "Transmitter Constellation Design Method for Optical Communications Using Red-green-blue Light-emitting Diodes," hereby incorporated by reference.

GOVERNMENT INTEREST

The invention described herein may be manufactured, used, and/or licensed by or for the United States Government.

BACKGROUND OF THE INVENTION

Recent advances in the design and manufacturing of light emitting diodes (LEDs) have led to predictions that they will soon replace traditional lighting technology in a variety of illumination and display applications, offering the possibility of simultaneous modulation for communications. Because of cost and complexity concerns, the leading technology for white-light illumination involves the combination of a single LED with a phosphor coating. However, red/green/blue (RGB) LEDs can also be used for white-light illumination, as well as in applications that require colored, light. An RGB LED actually comprises three separate LEDs, each producing a different color. These three colors are perceived as a single color that can be varied by altering the relative average intensities of the. three LEDs (red, green, and. blue).

The main benefits that LEDs offer over traditional lighting technology include improved efficiency, durability, and life. However, it is has long been recognized that, since LEDs can be modulated, they present an additional opportunity for their simultaneous operation as communication devices. Indeed, impressive data rates have been reported using white light LEDs as reported in H. L. Minh, et al., "100-Mb/s NRZ visible light communications using a postequalized white LED," IEEE Photonics Technology Letters, vol. 21,no, 15, pp. 1063-1065, August 2009 (hereby incorporated by reference). Because the communication system should not interfere with the primary application of the LEDs, additional constraints must be considered when designing the system. For example, modulated visible-light LEDs being used as illuminators should not appear to flicker, as this would undercut the quality of illumination and, worse, could pose a health hazard.

A variety of modulation and coding techniques have been considered for wireless optical communication, as described further in Z. Na, et ah, "The transmission performance of the MPPM modulation in indoor optical wireless communication based on white LED." in Proceeding of SPIE, 2008 (hereby incorporated by reference) and J. Grubor, et al., "Broadband information broadcasting using LED-based Interior lighting," Journal of Lightwave Technology, vol. 26, no. 24, pp. 3883-3892, December 2008 (hereby incorporated by reference). A use of color-shift keying (CSK), a modulation method recently proposed by the IEEE 802.15,7 Visible Light Communication Task Group, has been, described in IEEE 802.15.7 Visible Light Communication Task Group, (2010, Aug. 30). IEEE 802.15 Documents [Online] (hereby incorporated by referenced) (Available: https://mentor.ieee.org/802.15/documents?is group=0007).

By separately modulating the three emitters of an RGB LED, a wavelength diverse communication system can be obtained (exploiting a "red," a "green," and a "blue" channel). Amplitude-shift keying (ASK) and pulse-width modulation (PWM) can be modified to satisfy constraints on the perceived color of the LEDs. However, such constraints on perceived color and intensity, as well as system nonidealities including overlapping emission spectra, nonideal receiver filters, filter mismatch, and noise correlation in the three channels, complicates the design of optimal signaling constellations.

SUMMARY OF THE INVENTION

A preferred embodiment of this invention provides an automated system and method to approximately optimize the minimum distance between received constellation points in both, monochromatic and muitichromatic RGB-based optical communication systems while incorporating intensity and average-color constraints and the effect of linear channel impairments and correlated noise. The invention may be a secondary function of an illumination system, RGB displays, and/or signage. RGB LEDs offer three separate channels (red, green and blue.) that can be individually modulated for communication. The modulation may be designed so that it does not interfere with the primary use of the lighting element, intensity flicker is avoided, and the perceived colors are selectable.

A preferred embodiment of the present invention is directed to an algorithm that automates either the offline or online design of transmitted symbol constellations for amp lit tide-shift keying (ASK) or pulse-width modulation (PWM) in RGB-LED communication systems, incorporating system constraints and nonidealities; while approximately maximizing the minimum distance between received symbols.

A preferred method comprises identifying the region $R_{Tx}$ of potential transmitted symbols, identifying channel impairments, transforming $R_{Tx}$ according to the channel impairments into a region $R_{Rx}$ of potential received symbols, applying a billiards algorithm to obtain a symbol constellation in $R_{Rx}$, and inverting the linear transformation to obtain the designed transmitted-symbol constellation.

In accordance with the principles of the present invention, a method is described for the design of transmitter constellations for optical communication systems that use amplitude-shift keying (ASK) or pulse-width modulation (PWM) of the three emitters in a red/green/blue (RGB) light-emitting diode (LED). The general procedure consists of identifying the region $R_{Tx}$ of potential transmitted symbols, identifying linear channel impairments, transforming $R_{Tx}$ according to the linear channel impairments into a region $R_{Rx}$ of potential received symbols, applying a billiards algorithm to obtain a symbol constellation in $R_{Rx}$ that aims to maximize the minimum distance between constellation points, and inverting the linear transformation to obtain the designed transmitted-symbol constellation. A novel modification of the standard billiards algorithm addresses potential constraints imposed on the perceived color of the RGB LEDs.

A preferred method for optimizing signal recognition in a light communication, system by approximately maximizing the minimum distance between received constellation points comprises identifying the constellation region containing points for transmitting symbols, identifying channel impairments, transforming the constellation region according to the channel impairments into a constellation region of potential received symbols, using signal processing circuitry, applying an algorithm which operates to maximize the minimum distance between constellation points to obtain a symbol constellation in the receiver constellation region and inverting the transformation to obtain the designed transmitted-symbol constellation.

The invention is not limited to color-shift keying, which in essence constrains the combined intensity of the three emitters in the transmitting RGB LED. The method can be applied to systems using amplitude-shift keying (ASK) or pulse-width modulation (PWM) on each of the three emitters without a constraint on the total intensity. In such an embodiment, the algorithm described in following is generalized to consider the packing of (three-dimensional) spheres into a polyhedral received constellation region, Whether CSK, ASK, or PWM is used, the invention, also comprises a generalization to account for multi-chromatic systems (i.e., systems that contain multiple RGB LEDs that are potentially required to output different perceived colors). In this application, a novel modified billiards algorithm is applied in which the constellation region for each required perceived color is simulated separately while tracking the superposition of all of the constellations. Intensity and average-color constraints for each of the LEDs are enforced on the individual constellation regions, while an increasing minimum distance is enforced, on the superposition constellation.

The invention attempts to solve for the optimal, placement of constellation points in an RGB communication system, while prior work considers ad hoc placement of such constellation points. Furthermore, constraints on perceived color and LED intensity, effects of linear channel impairments and correlated noise, and support for multichromatic systems has not been utilized in the prior art.

CSK constrains total intensity to be a constant, resulting in substantially no intensity flicker and reduced in-rush current requirements. FIG. 1 illustrates examples of Color-Shift Keying (CSK) constellations. The CSK standard proposed by the IEEE 802.15.7 Visible Light Communication Task Group does not describe a method for producing constellations, but rather simply prescribes 4-CSK, 8-CSK, and 16-CSK constellations applicable to ideal monochromatic transmitters that ignore linear channel impairments. Furthermore, the prescribed 8-CSK and 16-CSK constellations are suboptimal in terms of the minimum distance between neighboring constellation points. For communication purposes, maximization of the minimum distance between colors is often optimal in the sense of achieving the minimum BEE for independent AWGN channels. Constellations proposed by the IEEE task group were not optimal in minimum distance, as indicated by the following comparison:

8-CSK:$d_{min}^{optimal} \sim \sim 0.471$ vs. $d_{min}^{IEEE} \sim \sim 0.485$

16-CSK:$d_{min}^{optimal} \sim \sim 0.272$ vs. $d_{minIEEE} \sim \sim 0.306$

If there are linear channel impairments or correlated noise, there may be a need for feedback from the receiver. Perceived color constraints may require a real-time algorithm, to allow for any desired color.

A preferred method may be used either in the static design of the transmitted symbol constellation of an RGB-based communication system or as a component of such a system providing real-time adaptation of the constellation, to changing constraints, channel conditions, and receivers. Such communication systems include both systems dedicated to communications and those in which communication is secondary to a primary function such as illumination, mood lighting, effect lighting, signage, or image/video display.

BRIEF DESCRIPTION OF THE DRAWINGS

The present invention can best be understood when reading the following specification with reference to the accompanying drawings, which are incorporated in and form a part of the specification, illustrate alternate embodiments of the present, invention, and together with the description, serve to explain the principles of the invention. In the drawings:

FIG. 1A is a schematic depiction of optimal transmitter/receiver constellations for ideal 8-CSK with no color balancing.

FIG. 1B is a schematic depiction of optimal transmitter/receiver constellations for ideal 8-CSK with white balancing.

FIG. 1C is a schematic depiction of optimal transmitter/receiver constellations for ideal 8-CSK with balancing at $[-0.15\ 0.30]^T$.

FIG. 2 is a schematic depiction of a flow chart that describes the algorithm and includes the pseudocode for the main algorithmic loop. FIG. 2 uses functions "initialize"and "wall_collision" that can apply to either case of color balancing or no color balancing.

FIG. 3 schematically illustrates the pseudocode, specifically applying to the case of no color balancing, for the functions in Boxes 17 and 18 that get called by the main algorithmic loop of FIG. 2.

FIG. 4 schematically illustrates the pseudocode for the functions in Boxes 19 and 20A that get called by the main algorithmic loop of FIG. 2.

FIG. 5 schematically illustrates the pseudocode for the functions in Boxes 20B and 21A that get called by the main algorithmic loop of FIG. 2, Box 20B is a continuation of Box 20A.

FIG. 6 schematically illustrates the pseudocode for the functions in Boxes 21B and 22 that get called by the main algorithmic loop of FIG. 2. Box 21B is a continuation of Box 21A.

FIG. 7 illustrates the pseudocode for the updated functions "initialize" and "wall_collision" that implements the changes described in FIG. 13. In particular, FIG. 7's updated function "initialize" implements the initialization requirements described in Box 52, and FIG. Ts updated function "wall_collision" implements the changes described in Boxes 53 and 55.

FIG. 9 is a schematic illustration showing suboptimal Color-Shift Keying (CSK) constellation examples.

FIG. 11 is a schematic graphical illustration of sample RGB spectra.

FIG. 12 is an overview of goals and objectives of receiver constellation design.

FIG. 13 is an overview illustration which includes, inter alia, constellation design constraints.

FIG. 14 is a schematic illustration of constellation design examples; 61 and 63 are suboptimal IEEE designs and 62 and 64 are preferred embodiment designs.

FIG. 15 is a schematic illustration of further constellation design examples.

FIG. 16 is a flow chart of the procedure for choosing the transmitted constellation points $s_1, s_2, \ldots, s_N$, where $s_i = [R_i\ G_i\ B_i]^T$.

Figure 8A:
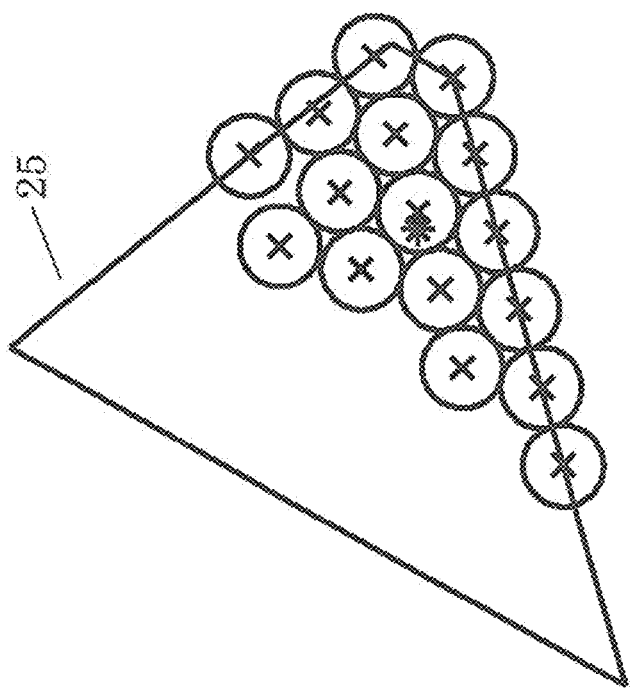
FIG. 8A is a schematic depiction of a receiver constellation for 16-CSK with distortion and off-white color balancing at the receiver, where $d_{min} \approx 0.1475$.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DETAILED DESCRIPTION OF THE PREFERRED EMBODIMENTS

The document entitled "Constellation Design for Color-Shift Keying Using Billiards Algorithms," by Robert J. Drost and Brian M. Sadler, Army Research Laboratory, Adelphi, Md. 20783-1138, published at IEEE GLOBECOM 2010 Workshop on Optical Wireless Communications, pages 980-984, is hereby incorporated by reference as though fully rewritten herein.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will folly convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more-other features, integers, steps, operations, elements, components, and/or groups thereof.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that are farthest, away.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, an etched region illustrated as a rectangle will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should, be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

One modulation method, color-shift keying (CSK), has been recently proposed specifically for red/green/blue (RGB) LEDs. The design of CSK signaling constellations is examined, incorporating the common requirement that the RGB LED outputs a specific, possibly time-varying, perceived color. In particular, this design problem is equated to that of disk packing and modified billiards algorithms are employed that rely on the "thermodynamic" settling of the disks to obtain constellation points with good minimum distance. Simulation results are presented that illustrate the design approach.

Using color-shift keying (CSK), the combined intensity of the three diodes in an RGB LED is held constant, while their relative intensities are varied. Hence, the instantaneous "color" of the RGB LED is used to transmit information. Benefits of this modulation format include the use of the three separate (red, green, and blue) channels for increased data throughput, constant total intensity to ensure flicker-free operation, and relaxed in-rush current requirements that may apply when modulating a large array of LEDs using other techniques such as on-off keying. In this paper, the design of CSK signaling constellations, i.e., the set of colors used to transmit information, is examined taking into account that the primary application of an RGB LED system would likely require the output of a particular, possibly time-varying, perceived color.

Problem Description

Assume an equivalent, discrete-time baseband model of the communication channel, as follows. In N-CSK, a data stream is first mapped to a sequence of symbols from an alphabet $A=(s_1, s_2, \ldots, s_N)$, where $N \geq 2$. In particular, each symbol $s \in A$ is a length-3 vector $s=[s_1\ s_2\ s_3]^T \in R^3$, such that the elements $s_1$, $s_2$, and $s_3$ of s give the intensities of the red, green, and blue LEDs, respectively, when s is transmitted.

Since intensity is nonnegative, $s_i \geq 0$ for all i. Furthermore, each of the LEDs will have a maximum output intensity $s_i^{max}$ that is not necessarily equal for all i. Next, a desired total intensity $C>0$ is assumed to be dictated by the primary function of the device; otherwise, C must be considered an additional design parameter. So, $s_1+s_2+s_3=C$ for all $s \in A$. Finally, an average value $s_{avg} \in R^3$ may be specified that dictates the desired average color output by the system. By designing the signal constellation such that $(1/N) \Sigma_i s_i = s_{avg}$ and enforcing that each symbol occurs equally often over a sufficiently short period of time, the system will be perceived as producing the single desired color. Equally likely symbols can either be assumed to occur based on probabilistic arguments or can be guaranteed using a suitable line code.

The constraints on the $s_i$ yield a polygonal region in $R^3$ of allowable constellation points. In particular, the polygon will consist of K sides, where $3 \leq K \leq 6$. A common case, corresponding to $C \leq s_i^{max}$ for all i, is K=3. For example, if $s_i^{max}=C$ for all i, then the allowable region is an equilateral triangle. Permitting $C>s_i^{max}$ for some i allows for an increased range of possible total intensities at a cost of a more, complex polygon (i.e., K>3) and a more restricted color gamut.

Next, these symbols are transmitted over a communications channel. A receiver optically filters the received signal to separate the red, green, and blue channels, and three photodetectors measure the received intensity in each of these bands. Based on the match between the emission spectra of the transmitter LEDs and the transmission spectra of the receiver niters, the output of the photodetectors is modeled as a linear combination of the transmitted symbol elements $s_1$, $s_2$, and $s_3$ that is corrupted by zero-mean additive white Gaussian noise (AWGN). (Note that the noise is assumed to be white in time; the noise detected by the three photodetectors at a particular time may be correlated because of, for example, wideband optical noise or overlap of the transmission spectra of the receiver filters.) It is assumed that both the parameters of the linear combination and the statistics of the noise are known either as component design parameters or else from, feedback of receiver measurements.

Noise considerations include noise in three received bands that may be correlated or of unequal variance. Types of noise include wideband optical noise through non-overlapping filter passbands, narrowband optical noise through overlapping filter passbands, and thermal noise well-modeled as uncorrelated. When processing noise through the receiver, a noise whitening filter may be applied and/or the received symbol, may be projected onto a noise-free constellation space. Hence, the received symbol components are linear combinations of the transmitted symbol in two-dimensional additive white Gaussian noise (AWGN). A decision as to which symbol was transmitted is based upon the nearest constellation point. The constellation design is performed in the received constellation space. The Rx constellation region is a linear transformation of the fx polygon. The desired average color in Rx space is determined via the same transformation. The minimum BER often requires a maximum $d_{min}$, the minimum distance between any two Rx constellation points. An inverse linear transformation is applied to a previously designed Rx constellation to obtain the designed Tx constellation.

A reasonable first step in processing the received symbol is to whiten the noise and scale it so that each component of the noise has equal variance. Note that this operation is also a linear transformation. Consequently, while the region of allowable transmitted symbols gets distorted by these transformations, it remains a polygon of the same number of sides. Hence, one can subsequently project the whitened received symbol onto the plane in which the distorted polygon lies to obtain a sufficient statistic in Rafor decoding. Because the components of the whitened noise have equal variance, the optimal solution is then given by the constellation point nearest in Euclidean distance-to this sufficient statistic.

The above model suggests the following approach to choosing the transmitted constellation points $s_1, s_2, \ldots, s_N$. First, the polygon corresponding to allowable transmitted symbols is determined. Then, making use of the known channel parameters, a linear transformation is applied to the polygon (or, rather, its vertices) to obtain the polygon of potential whitened received symbols (in the absence of noise) in $R^2$. Constellation points are chosen within this polygon that attempt, to maximize the minimum distance between them (thus providing maximum resistance to symbol errors due to the additive noise) while, if applicable, enforcing the required average received value, computed by applying the linear transformation to sim. Having obtained a suitable received symbol constellation, the transformation can be inverted to yield the designed transmitted-symbol constellation.

Billiards Algorithms

From the preceding discussion, it is clear that the difficulty in the constellation design lies in the optimisation of the received-symbol constellation. Since the goal is to maximize the minimum distance between constellation points within the bounding polygon, the problem can be formulated as a disk-packing problem. Disk packing has a long history of research (see, for example, M. Hifi and R. M'Hallah, "A literature review on circle and sphere packing problems: Models and methodologies," Advances in Operations Research, vol. 2009, pp. 1-22, (2009) (hereby incorporated by reference)), but provably optimal solutions are known primarily for simple or regular shapes and small numbers of disks. See, e.g., H. J. B, M. Melissen, "Densest packings of congruent circles in an equilateral triangle." The American Mathematical Monthly, vol. 100, no, 10, pp. 916-925, December 1993. However, it has been shown that the use of a numerical tool known as billiards simulation can yield good, and often optimal, solutions. See R. L. Graham and B. D. Lubaehevsky, "Dense packings of .equal disks in an equilateral triangle: From 22 to 34 and beyond," Electronic Journal of Combinatories, vol. 2, pp. 1-39, 1995.

Constellation Design without Color Balancing

In a billiards algorithm, the movement of disks (or, more generally, balls) within an enclosed region, is simulated. In particular, the times at which collisions are to occur are computed, and these collisions are sequentially processed by adjusting the states, i.e., the positions and velocities, of the involved disks. By steadily increasing the size of the disks, they eventually settle into a stable configuration. In the context of the design of the received-symbol constellation, the bounding region is given by the polygon in $R^2$ obtained through the linear transformation of the region of allowable transmitted symbols. The centers of the disks correspond to constellation points, and, assuming that the radius of the disks all grow at the same rate, the diameter of the disks is a lower bound on the minimum distance between constellation points at any given time. (Given this setup, it should be noted that a collision between a disk and a wall, i.e., an edge of the polygon, is deemed to have occurred when the center of the disk-rather than the edge of the disk-touches the wall.) Since billiards algorithms have been well studied, they do not need to be derived from scratch. Rather, pseudocode is provided in Appendix A describing a preferred embodiment implementation, which is based on B. D. Lubachevsky, "How to simulate billiards and similar systems," Journal of Computational Physics, vol. 94, no. 2, pp. 255-283, May (1991) (hereby incorporated by reference), and pertinent aspects are commented on.

The notation in Appendix A is next discussed. As previously defined, the input N refers to the number of disks to be simulated, and K refers to the number of sides of the bounding polygon. The input sequence w={$w_1, w_2, \ldots, w_K$}, where $w_i \in R^2$, gives the vertices of the bounding polygon in order along the perimeter. (Throughout, a sequence of scalars {$x_1, x_2, \ldots, x_M$} or vectors {$y_1, y_2, \ldots, y_M$} will be denoted by the corresponding unsubscripted regular-font letter x and y, respectively.) Note that this induces an indexing on the edges of the polygon. The sequence n comprises unit vectors $n_i \in R^2$ such that m is normal to edge i and is oriented toward the exterior of the polygon; n is computed from w.

The vector $r_{avg} \in R^2$ is the desired average value of the constellation points; it is ignored in the pseudocode of Appendix A, but modifications to the code to incorporate $r_{avg}$, when desired, will later be discussed. The input scalar "$KE_0$" (box 12 of FIG. 2) gives the initial total kinetic energy of the disks while the input scalar "rate" is the rate at which the disks grow. In particular, at time t, all disks will have diameter t×rate.

The sequences r and v each comprise vectors in $R^2$ that describe the states of the disks: r gives their positions while v gives their velocities. As shown in, inter aha, boxes 12-16 of FIG. 2, the sequence $t^{old}$ contains scalars that store the time at which the corresponding state information in r and v is valid. Meanwhile, the sequence $t^{new}$ contains scalars that predict the time at which the state of the corresponding disk will require an update. The causes of these potential updates, e.g., a collision with a wall or another disk, are described by the sequence of scalars f. A positive value of an element $f_1$ indicates the potential collision with disk a negative value indicates the potential collision with the polygon edge -$f_i$, and $f_i$=0 implies that no collision is predicted at time $t_1^{new}$ for disk i. Finally, the scalar output $d_{min}$ gives a lower bound on the minimum distance for the constellation determined by the algorithm.

Now, the algorithm first randomly initializes the states of the disks in the function "initialize," as depicted in box 17 of FIG. 3, There is freedom in how this randomization, is to be performed. Here, one deterministically sets the initial location of the disks within the polygon and then, randomly generates their velocities using the function "randn(n)" that produces a length-n vector of independent zero-mean Gaussian values of unit variance. The random velocities are then normalized so that the system has a total kinetic energy of $KE_0$.

The simulation proceeds by alternatingly processing the next scheduled update event and then, based on the hew positions and velocities, scheduling subsequent events for the affected disks. The main loop of the algorithm, (in boxes 12-15 of FIG. 2). tracks the scheduled events to ensure their appropriate sequencing and to recognize whether or not predicted events actually occur, The function "disk_collision" (box 19 of FIG. 4) updates the states of two disks that are involved in a collision, while the function "wall_collision" (box 18 of FIG. 3) processes a collision between a disk and a wall. (The function "wall_collision" has extra inputs and outputs that are unnecessary in this version of the code but that will be necessary when incorporating color balancing.) The updates in each case are based upon the elastic collision of disks of constant size, which does not result in an increase in the total kinetic energy of the disks. However, additional care must be taken when processing collisions between two disks, where, if the two disks do not depart with enough velocity, the growth of the disks could cause them to overlap. As in B. D. Lubachevsky, "How to simulate billiards and similar systems," Journal of Computational Physics, vol. 94, no, 2, pp. 255-283, May 1991 (hereby incorporated by reference), an offset is applied to the normal component of the velocity to ensure that overlap does not occur. However, the implementation here applies this offset much more judiciously, reducing the increase in kinetic energy and obviating the need for the additional normalization required in B. D. Lubachevsky, "How to simulate billiards and similar systems," Journal of Computational Physics, vol. 94, no. 2, pp. 255-283, (May 1991). The function "next_collision" (boxes 20A (FIG. 4) and 20B (FIG. 5)) predicts the time and type of the next state update needed for a particular disk. This function examines all possible pairwise collisions between the given disk and another disk or wall, choosing whichever would occur first. The time of each potential pairwise collision is computed using the functions "disk_collision_time" (boxes 21A (FIG. 5) and 21B (FIG. 6)) and "wall_collision_time," (box 22 of FIG. 6), each of which contain additional measures to ensure that round-off errors are appropriately managed.

In the presence of finite-precision arithmetic, the algorithm will eventually fail to progress. That is, continued iterations through the main loop will fail to advance the current time of the simulation, given by $\min_i t_i^{new}$. Hence, a reasonable termination criterion is that the current time be constant over a sufficiently large number of iterations. Upon completion of the algorithm, the locations of the received symbols in the designed constellation are given by the elements of r.

Constellation Design with Color Balancing

Incorporating color balancing into the constellation design requires only minor modifications to the previously presented algorithm. As shown in FIG. 13 the states of the disks are initialized so that the properties (1/N) $\Sigma_i r_i = r_{avg}$ and $\Sigma_i v_i = [00]^T$ are satisfied at t=0. Then it is ensured that the latter property holds for all simulation times t>0, thus guaranteeing the former property is also maintained, as desired.

Since the velocities of the disks are constant between collisions, it is algorithmically necessary only to preserve the property of zero-sum velocity during collisions. Inspection of Appendix A shows that this is already the case for collisions between disks. Hence, modifications are only necessary for collisions between a disk and a wall.

Appendix B provides modified functions that implement the color-balanced algorithm, where the function "randperra (N)" outputs a length-N vector containing the integers 1 to N in a random order. In particular, the color-balanced constellation is obtained by applying the original algorithm of Appendix A but with the functions "initialize" (box 17 of FIG. 3) and "wall_collision" (box 18 of FIG. 3) replaced by the corresponding functions in Appendix B. The modifications to the "initialize" function (box 23 of FIG. 7) are straightforward; however, the modified "wall_collision" function (box 24 of FIG. 7) will be briefly discussed.

In order to preserve the zero-sum velocity property during a collision between a disk and a wall, any change in velocity of the disk must be offset by corresponding changes in the velocities of the other disks in the system. An additional desirable property is that the kinetic energy of the system remains constant as well. If the kinetic energy is allowed to increase, the system could "heat, up" unboundedly, resulting in potential numerical instability. One solution would be to perform frequent checks on the kinetic-energy of the system, normalizing it when necessary. An Increase in kinetic energy is altogether avoided as follows.

Suppose that a disk i collides with a wall and that the component of the velocity normal to the wail is $v_{1,N}>0$. A second disk j is randomly chosen from those disks with negative normal, velocity component, i.e., $v_{j,N}<0$. The collision is then processed by swapping the normal velocity components of disks i and j.

Finally, it is noted that because of round-off error, the zero-sum velocity property will not exactly hold at all times and that such errors could potentially accumulate in the average position of the disks. However, it has been found empirically that the deviation is insignificant for practical simulation parameters.

Results

Presented in this section are examples of constellations designed using the proposed algorithms, implemented with double-precision arithmetic. The 8CSK case is first considered in an ideal system. In particular, it is assumed that $s_1^{max}=s_2^{max}=s_3^{max}=C=1$ and that the receiver observes the transmitted intensities in uncorrelated noise. As such, the transmitter and receiver constellations are both equilateral triangles, and no linear transformation is required in the design process. FIG. 1A shows the designed constellation when $r_{avg}$ is not specified. In this case, the optimal solution is known analytically, as reported in R. L. Graham and B. D. Lubachevsky, "Dense packings of equal disks in an equilateral triangle: From 22 to 34 and beyond." Electronic Journal of Combinatorics, vol. 2, pp. 1-39, 1995 (hereby incorporated by reference).

The minimum distance obtained by the simulation is approximately 0.4582 and agrees with the known optimum to within $10^{-12}$. Not shown, this case was also simulated specifying $r_{avg}$ to be the known average in the optimal solution. Clearly one would expect the same constellation to be output. Indeed, this was verified, and the resulting minimum distance was again correct to within $10^{-12}$. Next, FIG. 1B depicts the 8-CSK constellation when $r_{avg}=[0\ 0]^T$, where $r_{avg}$ is shown with an asterisk in the figure. It is observed that this disk packing is that of the known optimal packing of 10 disks in an equilateral triangle but with two disks removed. Hence, assuming that this is indeed, the optimal configuration, it is verifiable that the simulated minimum of distance of approximately 0.4273 agrees with the known optimum to within $10^{-12}$.

FIG. 1C illustrates an 8-CSK constellation constrained to have $r_{avg}=[-0.15\ 0.30]^T$. Although the solution given in FIG. 1C with $d_{min}\approx0.3058$ was not verified analytically, the result appears reasonable.

Finally, a more general design of a 16-CSK constellation was considered. An assumption, was made that $s_1^{max}=s_3^{max}=C=1$, but $s_2^{max}=0.9$. Next, it was assumed that a received symbol is given by $[s1\ 0.8s_2+0.1s_3\ 0.1s_2+0.8s_3]^T$ in uncorrelated noise. Also, it was specified that $s_{avg}=[0.25\ 0.60\ 0.15]^T$.

Figure 8B:
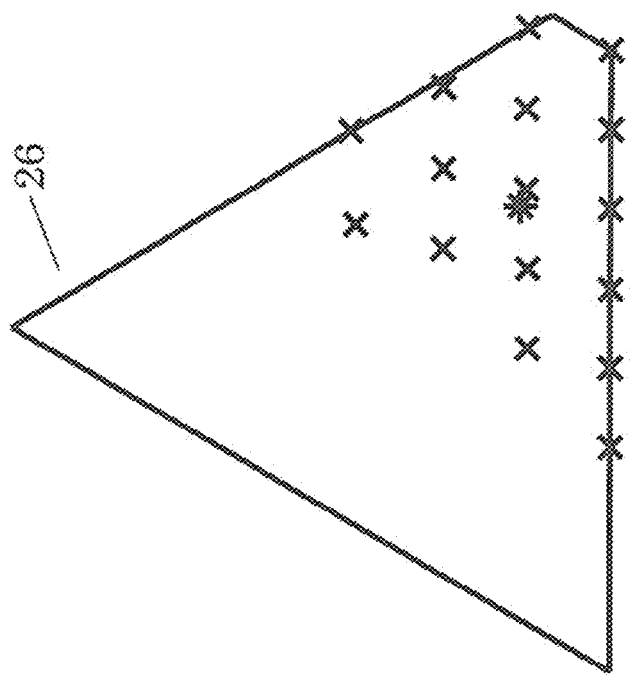
FIG. 8B is a schematic depiction of a transmitter constellation provided by inverting channel effects on the receiver (FIG. 8A) constellation. Once a suitable received symbol constellation is obtained (FIG. 8A), the channel transformation can be inverted to yield the designed transmitted-symbol constellation (FIG. 8B).
Figure 10:
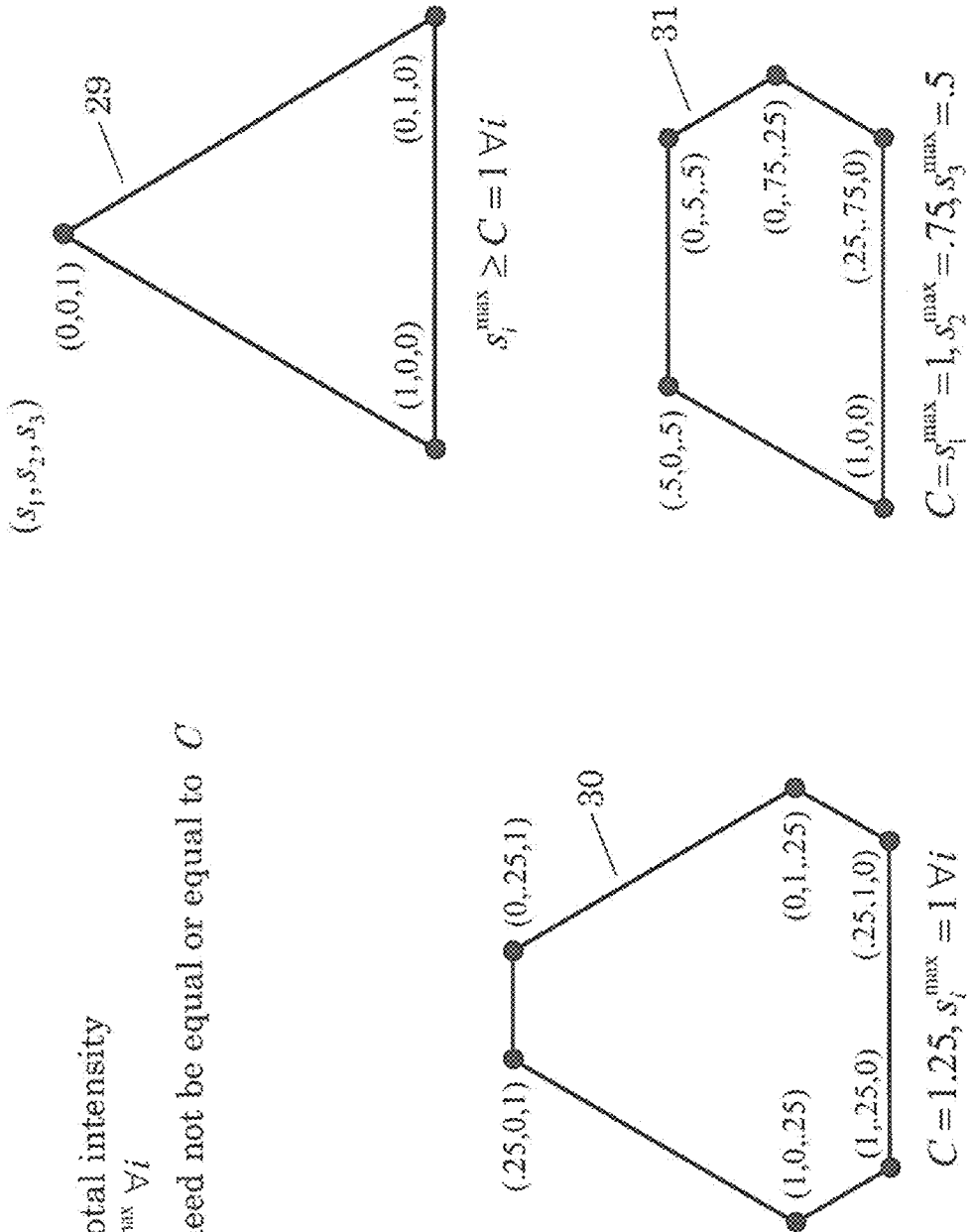
FIG. 10 is a schematic illustration showing examples of constellation design regions for various constraints on maximum LED intensities and average total intensities.

FIGS. 8A and 8B illustrate constellations for 16-CSK with distortion and off-white color balancing at the receiver and transmitter. FIG. 8A depicts the receiver constellation, where $d_{min}\approx0.1475$. Inverting the transformation yields the transmitter constellation in FIG. 8B. Hence, this example demonstrates the full design procedure.

It should be noted that while any given run of the algorithm yielded a reasonable design, suboptimal results were sometimes obtained. As such, it is suggested that for any given setup, a series of simulations with randomized initial disk velocities be performed and the resulting constellation of greatest minimum, distance be ultimately selected. For the results provided, ten simulations were performed for each scenario.

A preferred method for design of CSK. signaling constellations using billiards algorithms has been shown to be generally applicable, allowing for any size signaling alphabet, arbitrary polygonal constellation regions, and color-balancing requirements. Simulation results were presented that exemplify the solutions obtained by the algorithm.

Applications

Broadly speaking, red-green-blue (RGB) light-emitting diodes (LEDs) may have great potential as a communication technology. LEDs have been predicted to become a ubiquitous lighting technology, and as such, one will be able to leverage infrastructure (i.e., power sources and LEDs) that would be in place anyway when implementing an LED visible-light communication (VLC) system. Since the communication function of such LEDs would involve modulation that is imperceptible to humans, no significant degradation in the primary function (e.g., illumination) of the LEDs would be expected. Finally, LED VLC systems could provide for new avenues of communication (e.g., through traffic lights, signs, video displays, office lighting, etc.). could operate simultaneously with conventional communication systems to provide additional bandwidth (increasing achievable data rates) or to reduce the burden on the conventional system (e.g., establishing a visible light communication link among vehicles with headlights and taillights, allowing radio frequency (RF) systems to focus on longer-distance higher-priority functions), and could provide communications capability when conventional communications is not available (e.g., due to jamming, IED threats, etc) In essence, the ability to modulate LEDs for communications is nearly a "something-for-nothing" opportunity.

Within this broader technological context, the specific value of the disclosed constellation design method is the design of systems with improved performance. As discussed herein, one can model a received symbol (after, possibly, a noise whitening filter) in an RGB VLC system as a point r in a two-dimensional (2D) or three-dimensional (3D) constellation space plus (multidimensional) additive white Gaussian noise (AWGN). The optimal (minimum bit-error rate) decision rule: given such a model is to choose the symbol whose constellation point is nearest in Euclidean distance to the received point.

Let $r_0$ be the receiver constellation point corresponding to the transmitted symbol. Then it follows that an error is made for a received symbol r when $\|r-r_1\|>|r-r_0|$ for some other receiver constellation point $r_1$. Let $d=|r_1-r_0|$. Then, the probability that the receiver will choose the symbol corresponding to n instead of $r_0$ is given by $Q(d/2\sigma)$, where $\sigma^2$ is the variance of the projection of the AWGN onto $r_1-r_0$ and $Q(\cdot)$ is the tail probability of the standard normal distribution. It is clear, then, that maximizing the distance between $r_1$ and $r_0$ minimizes the probability of making this particular error. Minimizing the probability of the most likely pairwise error then leads to the design principle of maximizing the minimum distance between any two receiver constellation points.

It is precisely the above problem that the proposed method addresses for a. broad class of possible VLC system implementations (including channel modeling and compensation). As such, the practical value of the method is clear. Furthermore, it is noted that even if a system can achieve an acceptable bit-error rate without using the proposed method, the improved performance provides design margin that, can be traded oil with, for example, lower transmitted power (if this is an option for the primary use of the LED system), increased symbol rate, or higher-order signaling constellations.

A VLC system operates under unique constraints and channel conditions that the proposed method specifically addresses. The DC bias point (i.e., the perceived color) of a communicating LED is constrained by the primary function of the LED and may be time varying. As the desired perceived, color varies, either the communication rate or the constellation size must be modified to achieve a constant bit-error rate. Hence, a "one-size-fits-all" signaling approach is not appropriate for such a system.

Furthermore, the region of potential transmitted constellation points can be considerably more complex for an RGB VLC system than fox a conventional system. For example, the RGB VLC transmitter constellation region can be an irregular polygon of up to six sides, as compared to, for example, conventional phase-shift keying (PSK) in which ail transmitter constellation points must simply lie on a circle (i.e., have equal magnitude when treated as a vector with an in-phase component and a quadrature component). Placing points in such a polygon is more difficult, as evidenced by the inability to analytically determine optimum placements except in very special cases.

Next, conventional systems must often use sophisticated receiver algorithms to compensate for channel impairments such as multipath interference. As such, it is often not possible to use precompensation at the transmitter (for example, though constellation point placement) to simplify the receiver design. Rather, the distance between the transmitter constellation points is usually maximized (e.g., points are chosen equidistant around a circle in PSK). On the other hand, the previously discussed VLC channel model allows for the use of a simple but optimal thresholding receiver, provided precompensation is performed on the transmitter side in the form of an adapted constellation design.

Shown in FIG. 11 is a sample RGB LED spectra. As shown, there exists the potential for overlapping of the LED emission spectra. It might not be possible to perfectly separate emission, spectra and filtering out overlap regions wastes signal energy. The receiver filters may not be ideal and the filter passbands may be overlapping. There may also be unequal transmission coefficients. Moreover, neighboring LED light may be passed, even if transmission, spectra do not overlap.

Finally, the proposed method can be used to design signaling constellations in systems with multiple LEDs, each having its own (potentially time-varying) DC bias point. This, design problem is unique to VLC systems. Not only are there different constraints on the transmitting devices, but their constellations must be designed jointly to avoid interfering with each other.

FIG. 12 contains, Inter alia, an overview of receiver constellation design. Box 42 refers to the packing of H disks of maximum radius in an equivalent fashion. Box 43 refers to the standard billiards algorithm for N-CSK including the step of initializing disks of radius 0 with arbitrary positions and arbitrary velocities such that $KE_0$ is equal to the summation of $|v_i(0)|^2$ from i=1 to N. Box 44 refers to motion of disks being tracked while increasing the radii. Frictionless motion and essentially elastic disk/wall and disk/disk collisions are contemplated in, algorithmically, an event based simulation, with the best configuration being selected after multiple runs.

FIG. 13 contains, inter alia, an overview of color-constrained receiver-constellation design. It is required that final points satisfy $$\frac{1}{N}\sum_{i=1}^{N} r_i = r_{avg}.$$

The disks are initialized such that $$\frac{1}{N}\sum_{i=1}^{N} r_i(0) = r_{avg},$$

$$\sum_{i=1}^{N} v_i(0) = 0,$$

and $$KE_0 = \sum_{i=1}^{N} \|v_i(0)\|^2$$

in box 52 of FIG. 13. Simulation "physics" are modified in Box 53 such that $\Sigma_{i=1}^{N} v_i(t)=0 \forall 1$, so that $$\frac{1}{N}\sum_{i=1}^{N} r_i(t) = $$

$$\frac{1}{N}\sum_{i=1}^{N}\left[r_i(0) + \int_0^\tau v_i(\tau)d\tau\right] = \frac{1}{N}\sum_{i=1}^{N} r_i(0) + \frac{1}{N}\int_0^\tau \sum_{i=1}^{N} v_i(\tau)d\tau = r_{avg}.$$

The disk/disk collisions in the standard algorithm preserve the zero-sum velocity condition, as shown in box 54. The disk/wall collisions are modified such that, when a disk contacts a wall, another disk is chosen that is moving away from the wall and the components of the disks' velocities that are normal to the wall are swapped, Which also conserves momentum.

FIGS. 14 and 15 illustrate examples of TX unconstrained and constrained constellation design examples, respectively.

FIG. 16 is an overview of transmitted constellation designs. In box 71, the polygon corresponding to the allowable transmitted symbols is determined. In box 72, a linear transformation Is applied to the polygon (or rather its verticies), making use of known channel parameters, to obtain the polygon of potential whitened received symbols (in the absence of noise.) in R2. In box 73, constellation points are chosen within this polygon that attempt to maximize the minimum distance between them (thus providing maximum resistance to symbol errors due to additive noise) while, if applicable, enforcing the required average received value, computed by applying the linear transformation to $s_{avg}$. In box 74, once a suitable received symbol constellation is obtained, the transformation, can be inverted to yield the designated transmitted symbol constellation.

As used herein, the terminology "color-shift keying" refers to a digital modulation scheme for optical communication systems using two or more independently controlled emitters of different wavelengths in which the norm of the transmitted symbols in a discrete-time model of the system are constrained to be constant. That is, the total combined intensity of light output by the emitters averaged over any symbol period is constrained to be constant while information is conveyed by the relative intensities of the emitters, again averaged over the symbol period.

As used herein the term $R_{Tx}$ is a region of potential transmitted symbols and $R_{Rx}$ is a region of potential received symbols. More precisely, having defined a constellation, $R_{Tx}$ is the set of points in Euclidean space that can be used for the transmitter constellation design., and $R_{Rx}$ is the image of $R_{Tx}$ under the channel transformation and represents the possible symbols (over all possible transmitter constellations) that might be received by the receiver in the absence of noise.

The case of linear channel impairments (and, hence, a linear transformation) is addressed in the foregoing, but some nonlinearities could be incorporated into the method. Most broadly interpreted, the preferred embodiment methodology only requires an invertible channel transformation. However, the bounds of the invention are not limited to the description given.

Similarly, although only RGB LEDs are described in the foregoing, this is merely an example. However, the method could be used (possibly with some generalization) for any system using LEDs with multiple emitters of different wavelengths. Although RGB LEDs are by far the most common, a quick search shows such combinations as Blue-Green, Blue-Green-Orange, Green-Red-Orange, and Red-Green-Blue-Amber, and one of ordinary skill in the-art would appreciate that the invention extends to such lights and/or emitters (such as infrared or ultraviolet). Modifications to the algorithm would accommodate for the specific, number of emitters and whether or not the constant intensity constraint of CSK is being applied. For example, instead of fitting disks into a polygon, the generalization for CSK with a Red-Green-Blue-Amber LED would be to fit spheres into a polyhedron.

The scope of the invention also encompasses use of more than one multichromatic LED with distinct color constraints on each. In this application, a novel modified billiards algorithm is applied in which the constellation region for each required perceived color is simulated separately while tracking the superposition of all of the constellations. Intensity and average-color constraints for each of the LEDs are enforced on the individual constellation regions, while an increasing minimum distance is enforced on the superposition constellation.

A preferred embodiment comprises a general model for optical wireless communication with an RGB LED. The preferred embodiment involves interpretation of constellation design as disk packing with the application of standard billiards to unconstrained constellation design and the application of modified billiards algorithm for constrained design. The principles of the present invention may be extended to design of constellations for multichromatic systems.

As used herein, the terminology "point" or "points" in reference to a constellation refers to signal components $s_1$, $s_2$, and $s_3$, of a signal s that give the intensities of the red, green, and blue LEDs, respectively, when the signal s is transmitted.

As used herein the terminology "constellation" means a set of points in Euclidean space that, given a discrete-time model of a communication system, describe the symbols used to convey information from a transmitter to a receiver. In particular, the coordinates of a constellation point correspond to the amplitudes of analog waveforms that are components of signals that are transmitted or received by the communication system such that notions of differentiation between waveforms are well-mapped to the Euclidean distances between corresponding points.

As used herein the terminology "constellation region" refers to the possible points that can be chosen as constellation points in a constellation design.

As used herein the terminology "signal processing circuitry" includes a computer, processor, microprocessor, multiprocessor, controller, mainframe, or a plurality of computers, processors, microprocessors, multiprocessors, controller, or mainframes or equivalents thereof.

As used herein, the terminology "maximized distance" in reference to the constellation points refers to the distance between the receiver constellation points which is maximized (generally the objective is to maximize the minimum distance).

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

APPENDIX A

APPENDIX (Computer Program Listing): Billiards Algorithm for Constellation Design Without Color Balancing.

```
Input: N, w, r_avg (if desired), KE_0, rate
Output: r, d_min
Compute n from w
(r,v) ← initialize(w,n,r_avg, KE_0)
while termination criterion not met do
    i* ← argmin t_i^new
    r_i* ← r_i* + (t_i^new − t_i^old)v_i*
    t_i*old ← t_i*new
    j* ← f_i*
    if j* > 0 then
        r_j* ← r_j* + (t_j*new − t_j*old)v_j*
        t_j*old ← t_j*new
        (v_i*,v_j*) ← disk_collision(r_i*,v_i*,r_j*,v_j*,rate)
    end if
    if j* < 0 then
        (r,v,t^old,t^new,f) ← wall_collision(i*,r,v,t^old,t^new,f,n_j*)
    end if
    if j* > 0 then
        (t^new,f) ← next_collision(j*,i*,r,v,t^old,t^new,f,w,n,rate)
    end if
    (t^new,f) ← next_collision(i*,j*,r,v,t^old,t^new,f,w,n,rate)
end while
t ← min t_i^new
r_i ← r_i + (t − t_i^old)v_i ∀i
d_min ← t × rate
FUNCTION (r,v) ← initialize(w,n,r_avg, KE_0)
    center ← (1/K) Σ_k w_k
    dist ← min_k [(wk − center) · n_k]
```
$$r_i \leftarrow \text{center} + \frac{\text{dist}}{2}\left[\cos\left(\frac{2\pi i}{N}\right)\sin\left(\frac{2\pi i}{N}\right)\right]^T \forall i$$
```
    v_i ← randn(2) ∀i
    KE ← Σ_i ||v_i||^2
```

APPENDIX A-continued

APPENDIX (Computer Program Listing): Billiards Algorithm for Constellation Design Without Color Balancing.

```
v_i ← v_i √(KE_0/KE) ∀ i
FUNCTION (v_i*,v_j*) ← disk_collision (r_i*, v_i*, r_j*, v_j*, rate)
  u_N ← (r_j* - r_i*)/||r_j* - r_i*||
  u_T ← [u_N(2) -u_N(1)]^T
  v_i*,N ← v_i* · u_N
  v_j*,N ← v_j* · u_N
  offset ← max{0, 1.01 × rate - (v_i*,N - v_j*,N)/2}
  v_i* ← (v_j*,N - offset)u_N + (v_i* · u_T)u_T
  v_j* ← (v_i*,N + offset)u_N + (v_j* · u_T)u_T
FUNCTION (r,v,t^old,t^new,f) ← wall_collision(i*,r,v,t^old,t^new,f,u_N)
  u_T ← [u_N(2) -u_N(1)]^T
  v_i* ← -(v_i* · u_N)u_N + (v_i* · u_T)u_T
FUNCTION (f,t^new) ← next_collision(i*,j*,r,v,t^old,t^new,f,w,n,rate)
  P ← ∞
  for j = 1 to N, j ≠ i*, j ≠ j* do
    t* ← disk_collision_time(r_i*,v_i*,t_i*^old,r_j,v_j,t_j^old)
    if t* < P AND t* ≤ t_j^new then
      P ← t*
      p ← j
    end if
  end for
  Q ← ∞
  for j = 1 to K do
    t* ← wall_collision_time(r_i*,v_i*,t_i*^old,w_j,n_j)
    if t* < Q then
      Q ← t*
      q ← j
    end if
  end for
  if Q < P then
    f_i* ← q
    t_i*^new ← Q
  else
    f_i* ← p
    t_i*^new ← P
    if f_p > 0 AND f_(f_p) = p then
      f_(f_p) ← 0
    end if
    f_p ← i*
    t_p^new ← P
  end if
FUNCTION t* ← disk_collision_time(r_i*,v_i*,t_i*^old,r_j,v_j,t_j^old)
  t̃ ← max{t_i*^old, t_j^old}
  r̃_i* ← r_i* + (t̃ - t_i*^old)v_i*
  r̃_j ← r_j + (t̃ - t_j^old)v_j
  if ||r̃_j - r̃_i*|| < t̃ × rate then
    t* ← t̃
  else
    a ← ||v_j - v_i*||^2 - rate^2
    b ← (r̃_j - r̃_i*) · (v_j - v_i*) - t̃ × rate^2
    c ← ||r̃_j - r̃_i*||^2 - (t̃ × rate)^2
    if b^2 - ac < 0 then
      t* ← ∞
    else
      Δt ← -(b + √(b^2-ac))/a
      if Δt < 0 then
        t* ← ∞
      else
        t* ← t̃ + Δt
      end if
    end if
  end if
FUNCTION t* ← wall_collision_time(r_i*,v_i*,t_i*^old,w_j,n_j)
  v_i*,N ← v_i* · n_j
  if v_i*,N < 0 then
    t* ← ∞
  else
    t* ← t_i*^old + [(w_j - r_i*) · n_j]/v_i*,N
  end if
```

APPENDIX B

APPENDIX (Computer Program Listing): Alternative functions for color-balanced constellation design.

```
FUNCTION (r, v) ← initialize(w, n, r_avg, KE_0)
  dist ← min_k[(w_k - r_avg) · n_k]
  r_i ← r_avg + (dist/2)[cos(2πi/N) sin(2πi/N)]^T ∀ i
  v_i ← randn(2) ∀ i
  v_avg ← (1/N) Σ_i v_i
  v_i ← v_i - v_avg ∀ i
  KE ← Σ_i ||v_i||^2
  v_i ← v_i √(KE_0/KE) ∀ i
FUNCTION (r, v, t^old, t^new, f) ← wall_collision(i*, r, v, t^old, t^new, f, u_N)
  π ← randperm(N)
  k* ← min{k : π(k) ≠ i* AND v_π(k) · u_N < 0}
  j* ← π(k*)
  u_T ← [u_N(2) - u_N(1)]^T
  temp ← v_i* · u_N
  v_i* ← (v_j* · u_N)u_N + (v_i* · u_T)u_T
  r_j* ← r_j* + (t_i*^new - t_j*^old)v_j*
  v_j* ← temp × u_N + (v_j* · u_T)u_T
  t_j*^old ← t_i*^new
  t_j*^new ← t_i*^new
  if f_j* > 0 then
    f_(f_j*) ← 0
  end if
  f_j* ← 0
```

What is claimed is:

1. A method for optimizing signal recognition in a multi-wavelength optical communication system by approximately maximizing the minimum distance between received constellation points; the method comprising:
   identifying the constellation region containing points representing signals having multiple wavelengths for transmitting symbols;
   identifying channel impairments;
   transforming the constellation region according to the channel impairments into a constellation region of potential received symbols;
   using signal processing circuitry, applying an algorithm which operates to maximize the minimum distance between constellation points to obtain a symbol constellation in the receiver constellation region; and
   inverting the transformation to obtain the designed transmitted-symbol constellation.

2. The method of claim 1 wherein the applied algorithm is a billiards algorithm and the method is used in an RGB-LED communication system for one of amplitude-shift keying (ASK) or color-shift keying (CSK).

3. The method of claim 1 wherein the applied algorithm is a billiards algorithm and the method is used for pulse-width modulation (PWM) in an RGB-LED communication system.

4. The method of claim 1 wherein $r_0$ is a receiver constellation point corresponding to the transmitted symbol and an error is made for a received symbol r when $||r - r_1|| \leq ||r - r_0||$, where $r_1$ is another receiver constellation point and the probability that the receiver will choose the symbol corresponding to $r_1$ instead of $r_0$ is given by $Q(||r_1 - r_0||/(2\sigma))$, where $\sigma^2$ is the variance of the projection of the additive white Gaussian noise onto $r_1 - r_0$ and $Q(\cdot)$ is the tail probability of the standard normal distribution.

5. The method of claim 1 wherein ro is a receiver constellation point corresponding to the transmitted symbol and an error is made for a received symbol r when $\|r - r_1\| < \|r - r_0\|$, where $r_1$ is another receiver constellation point.

6. The method of claim 1 wherein the light communication system is a secondary function of an LED system and the DC bias point corresponding to the perceived color of a communicating LED is constrained by the primary function of the LED and may be time varying such that, as the desired perceived color varies, either the communication rate or the constellation size may have to be modified to achieve a constant bit-error rate.

7. The method of claim 1 wherein the transmitter constellation region comprises red, green, and blue colors forming a region that is a polygon comprising three to six sides.

8. The method of claim 1 wherein the constellation region may be modified either on-line or off-line for performance improvement or for adaptation of the constellation to changing constraints, channel conditions, and receivers.

9. The method of claim 1 wherein the method comprises creating a plurality of constellations for systems with multiple LEDs, each having its own potentially time-varying DC bias point, whereby the constellations of different LEDs are designed jointly to avoid interfering with each other by identifying the region $R_{Tx}$ of potential transmitted symbols, identifying linear channel impairments, transforming the region $R_{Tx}$, according to the linear channel impairments into a region $R_{Rx}$ of potential received symbols, applying an algorithm to obtain a symbol constellation in $R_{Rx}$ that operates to maximize the minimum distance between constellation points, and inverting the linear transformation to obtain the designed transmitted-symbol constellation.

10. The method of claim 1 wherein the constellation point placement in the constellation region precompensates at the transmitter to simplify the receiver design.

11. The method of claim 1 wherein the light communication system comprises at least one LED having a desired perceived color which is constrained by the primary function of the LED that varies in time, such that when the desired perceived color varies either the communication rate or the constellation size must be modified to achieve a constant bit-error rate.

12. The method of claim 1 wherein the applied algorithm is a billiards algorithm and the constellation points for each required perceived color are simulated separately while tracking the superposition of all the corresponding constellation points, and intensity and average-color constraints for each of the LEDs are enforced on the individual constellations while an increasing minimum distance between constellation points is maintained on the superposition of the corresponding constellation points.

13. The method of claim 1 where a data stream is first mapped to a sequence of symbols corresponding to an alphabet where each letter is formed by $\{S_1, S_2, \ldots, S_N\}$, where N>1 is the number of constellation points and $S_1, S_2, \ldots, S_N$ correlate to different colored constellation points.

14. The method of claim 13 wherein each symbol is a length-3 vector $s = [s_1 s_2 s_3]^T \in R^3$, such that the elements $s_1$, $s_2$, and $s_3$ of s give the intensities of the red, green, and blue LEDs, respectively, when s is transmitted.

15. The method of claim 1 wherein the light communication system operates through one of traffic lights, signs, headlights, taillights, or office lighting to provide additional bandwidth and increased achievable data rates.

16. The system of claim 1 wherein the step of transforming the constellation region according to the channel impairments comprises providing real-time adaptation of the constellation to changing constraints, channel conditions, and receivers.

17. A method of light communication comprising
determining a polygon comprising points for transmitting symbols;
making use of the known channel parameters, applying a linear transformation to the polygon vertices to obtain a transformed polygon of potential received symbols;
obtaining a suitable receiver symbol constellation by choosing constellation points corresponding to allowable transmitted symbol points within the polygon that attempt to maximize the minimum distance between points in order to provide the maximum resistance to symbol errors due to additive noise; and
inverting the transformation to yield the designed transmitted-symbol constellation.

18. The method of claim 17 wherein the step of obtaining a suitable receiver symbol constellation comprises maintaining the required average received value computed by applying the linear transformation to the required average of transmitter constellation points.

19. The method of claim 17 wherein the step of obtaining a suitable receiver symbol constellation comprises applying an algorithm used for simulating the locations of billiard balls.

20. A system for transmitting multiwavelength optical communication signals comprising signal processing circuitry, the signal processing circuitry operating to:
determine a polygon comprising points representing signals having multiple wavelengths for transmitting symbols;
making use of the known channel parameters, applying a linear transformation to the polygon vertices to obtain a transformed polygon of potential received symbols;
obtaining a suitable receiver symbol constellation by choosing constellation points corresponding to allowable transmitted symbol points within the polygon that attempt to maximize the minimum distance between points in order to provide the maximum resistance to symbol errors due to additive noise; and
invert the transformation to yield the designed transmitted-symbol constellation.

* * * * *